(12) United States Patent
Inagaki et al.

(10) Patent No.: US 10,502,600 B2
(45) Date of Patent: Dec. 10, 2019

(54) ELECTROMAGNETIC FLOWMETER

(71) Applicant: AZBIL CORPORATION, Chiyoda-ku (JP)

(72) Inventors: Hiroyuki Inagaki, Chiyoda-ku (JP); Osamu Momose, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 0 days.

(21) Appl. No.: 16/299,306

(22) Filed: Mar. 12, 2019

(65) Prior Publication Data

US 2019/0285444 A1 Sep. 19, 2019

(30) Foreign Application Priority Data

Mar. 13, 2018 (JP) ................................ 2018-045407

(51) Int. Cl.
| | |
|---|---|
| *G01F 1/58* | (2006.01) |
| *G01F 1/60* | (2006.01) |
| *G01F 15/14* | (2006.01) |

(52) U.S. Cl.
CPC ............... *G01F 1/60* (2013.01); *G01F 1/584* (2013.01); *G01F 15/14* (2013.01)

(58) Field of Classification Search
None
See application file for complete search history.

(56) References Cited

U.S. PATENT DOCUMENTS

| 4,507,975 | A | * | 4/1985 | Bittner ................... G01F 1/584 |
| | | | | 73/861.12 |
| 4,607,533 | A | * | 8/1986 | Kuroda .................... G01F 1/58 |
| | | | | 73/861.12 |

FOREIGN PATENT DOCUMENTS

| JP | 08-021757 | 1/1996 |
| JP | 5887683 | 2/2016 |

* cited by examiner

*Primary Examiner* — Harshad R Patel
(74) *Attorney, Agent, or Firm* — Oblon, McClelland, Maier & Neustadt, L.L.P.

(57) ABSTRACT

An electromagnetic flowmeter includes a measuring tube, first and second printed circuit boards fixed to the measuring tube, a housing accommodating the measuring tube and the first and second printed circuit boards and supporting the first and second printed circuit boards, joints made of an electrically conductive material and fixed to the housing, each joint having a cylindrical portion that forms a fluid passage in cooperation with the measuring tube, and connecting components each sandwiched by a corresponding one of the first and second printed circuit boards and a corresponding one of the cylindrical portions. Each connecting component is configured to elastically deform to reduce a distance between one end and the other end of the connecting component. Each connecting component electrically connects a corresponding one of the cylindrical portions to a shield pattern (electrically conductive portion) of a corresponding one of the first and second printed circuit boards.

8 Claims, 7 Drawing Sheets

ELECTROMAGNETIC FLOWMETER

CROSS-REFERENCE TO RELATED APPLICATIONS

The present application is based on and claims priority to Japanese Application No. 2018-045407, filed Mar. 13, 2018, the entire contents of which are incorporated herein by reference.

BACKGROUND

1. Field

The present disclosure relates to an electromagnetic flowmeter including a joint that forms a fluid passage in cooperation with a measuring tube.

2. Description of the Related Art

As described in, for example, Japanese Unexamined Patent Application Publication No. 8-021757, an existing electromagnetic flowmeter includes electrodes (hereinafter, referred to as common electrodes) that are exposed to a fluid to be measured in addition to a pair of electrodes for acquiring a flow rate signal. The common electrodes described in Japanese Unexamined Patent Application Publication No. 8-021757 are formed in a ring shape and respectively provided at both ends of a measuring tube. Each common electrode is connected to a measuring circuit via a lead wire.

As described in, for example, Japanese Patent No. 5887683, each common electrode may be made up of a joint for connecting a tube, attached to a housing of an electromagnetic flowmeter. Each of the joints of the electromagnetic flowmeter described in Japanese Patent No. 5887683 has a pin-shaped terminal extending toward the inside of the housing. This pin-shaped terminal is able to connect the common electrode to a lead wire via a connector and is able to connect the common electrode to a measuring circuit via these connector and lead wire.

In electrically connecting each joint to the measuring circuit, a terminal connected to the measuring circuit via a lead wire may be screwed to the joint.

In the existing electromagnetic flowmeter described in Japanese Unexamined Patent Application Publication No. 8-021757, Japanese Patent No. 5887683, or the like, for electrical continuity with each common electrode, the lead wire and a component, such as the pin-shaped terminal, the connector, and a screw terminal, for connecting the lead wire to the common electrode are required. Moreover, when the pin-shaped terminal extending from the joint is used, a seal component for sealing a portion at which the terminal extends through the housing is further required. When the screw terminal is used, work for machining a threaded hole in the joint is also required.

For these reasons, with the above-described existing electromagnetic flowmeters, there is a problem that the number of components and assembly man-hours increase and, as a result, manufacturing cost increases.

SUMMARY

It is an object of the present disclosure to hold down the manufacturing cost of an electromagnetic flowmeter by simplifying a structure for electrical continuity with a joint that functions as a common electrode.

To achieve this object, an electromagnetic flowmeter according to an aspect of the present disclosure includes a measuring tube, a printed circuit board, a housing, a joint, and a connecting component. A fluid to be measured flows through the measuring tube. The printed circuit board has a through-hole through which the measuring tube extends. The printed circuit board is fixed to the measuring tube in a state where the measuring tube is passed through the through-hole. The housing has a connecting port at a location facing an end of the measuring tube. The housing accommodates the measuring tube and the printed circuit board. The housing supports the printed circuit board. The joint is made of an electrically conductive material. The joint is fixed to the housing. The joint has a cylindrical portion. The cylindrical portion is inserted in the connecting port of the housing. The cylindrical portion forms a fluid passage in cooperation with the measuring tube. The connecting component is sandwiched by the printed circuit board and the cylindrical portion of the joint. The printed circuit board has an electrically conductive portion facing the cylindrical portion. The connecting component has one end that contacts with the electrically conductive portion and an other end that contacts with the cylindrical portion. The connecting component is configured to elastically deform to reduce a distance between the one end and the other end by a predetermined amount. The connecting component electrically connects the cylindrical portion to the electrically conductive portion.

In the electromagnetic flowmeter according to the aspect of the present disclosure, the connecting component may be formed in a ring shape with a hollow that allows insertion of the measuring tube.

The electromagnetic flowmeter according to the aspect of the present disclosure may further include an electrode provided on an outer surface of the measuring tube, and the printed circuit board may have a measuring circuit connected to the electrode and the electrically conductive portion.

In the electromagnetic flowmeter according to the aspect of the present disclosure, the printed circuit board may be provided at each end of the measuring tube.

In the electromagnetic flowmeter according to the aspect of the present disclosure, the electrically conductive portion may be a shield pattern provided all over one of principal surfaces of the printed circuit board, and the one of the principal surfaces may face the cylindrical portion.

In the electromagnetic flowmeter according to the aspect of the present disclosure, the connecting component may be a metal washer in which a first contact portion that contacts with the electrically conductive portion and a second contact portion that contacts with the cylindrical portion are provided alternately in a circumferential direction of the washer.

In the electromagnetic flowmeter according to the aspect of the present disclosure, the connecting component may be a metal belleville spring.

In the electromagnetic flowmeter according to the aspect of the present disclosure, the connecting component may be a metal helical compression spring having a center portion through which the measuring tube is inserted.

According to the aspect of the present disclosure, when the joint is attached to the housing in a state where the connecting component is sandwiched by the printed circuit board and the cylindrical portion of the joint, the electrically conductive portion of the printed circuit board is electrically connected to the joint. Therefore, a component required to electrically connect the joint to the electrically conductive portion of the printed circuit board is only the connecting component. Connection of the joint to the electrically conductive portion by the connecting component is achieved in process of attaching the joint to the housing, so no exclusive work for electrical connection is required. Therefore, since the joint is simply electrically connected to the electrically conductive portion of the printed circuit board by the only one connecting component, a structure for electrical continuity with the joint is simplified, and work for electrical continuity with the joint is simple, with the result that a manufacturing cost for an electromagnetic flowmeter is held down.

DETAILED DESCRIPTION

Hereinafter, one embodiment of the electromagnetic flowmeter according to the aspect of the present disclosure will be described in detail with reference to FIG. 1 to FIG. 9.

Figure 1:
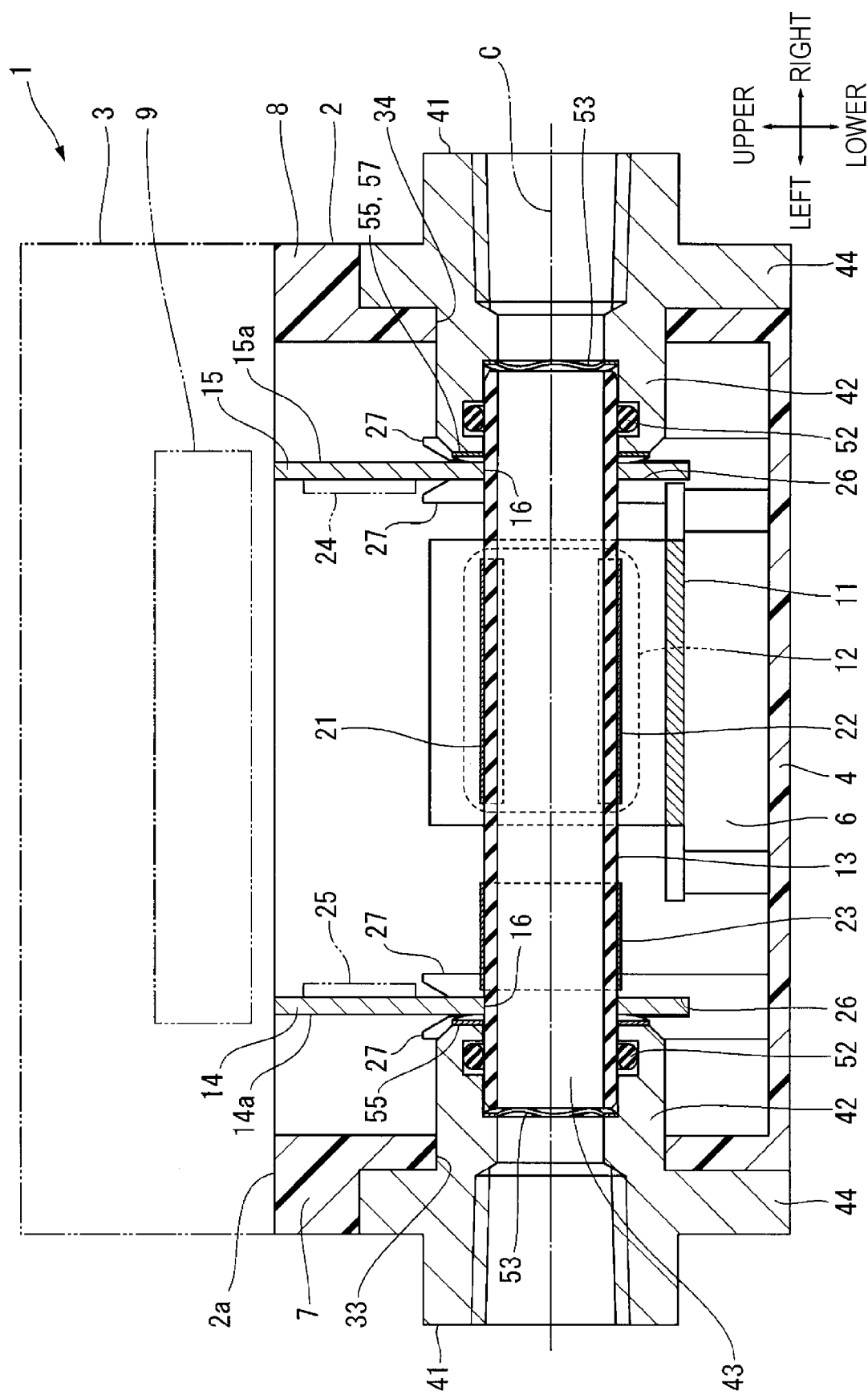
FIG. 1 is a cross-sectional view of a housing portion of an electromagnetic flowmeter according to an embodiment of the present disclosure.

An electromagnetic flowmeter 1 shown in FIG. 1 is of a capacitance type. The electromagnetic flowmeter 1 includes a box-shaped housing 2 and a lid 3. The box-shaped housing 2 is located on the lower side in FIG. 1. The lid 3 closes an opening 2a of the housing 2. FIG. 1 is a cross-sectional view taken along the line I-I in FIG. 2 that is a plan view of a housing portion.

Figure 2:
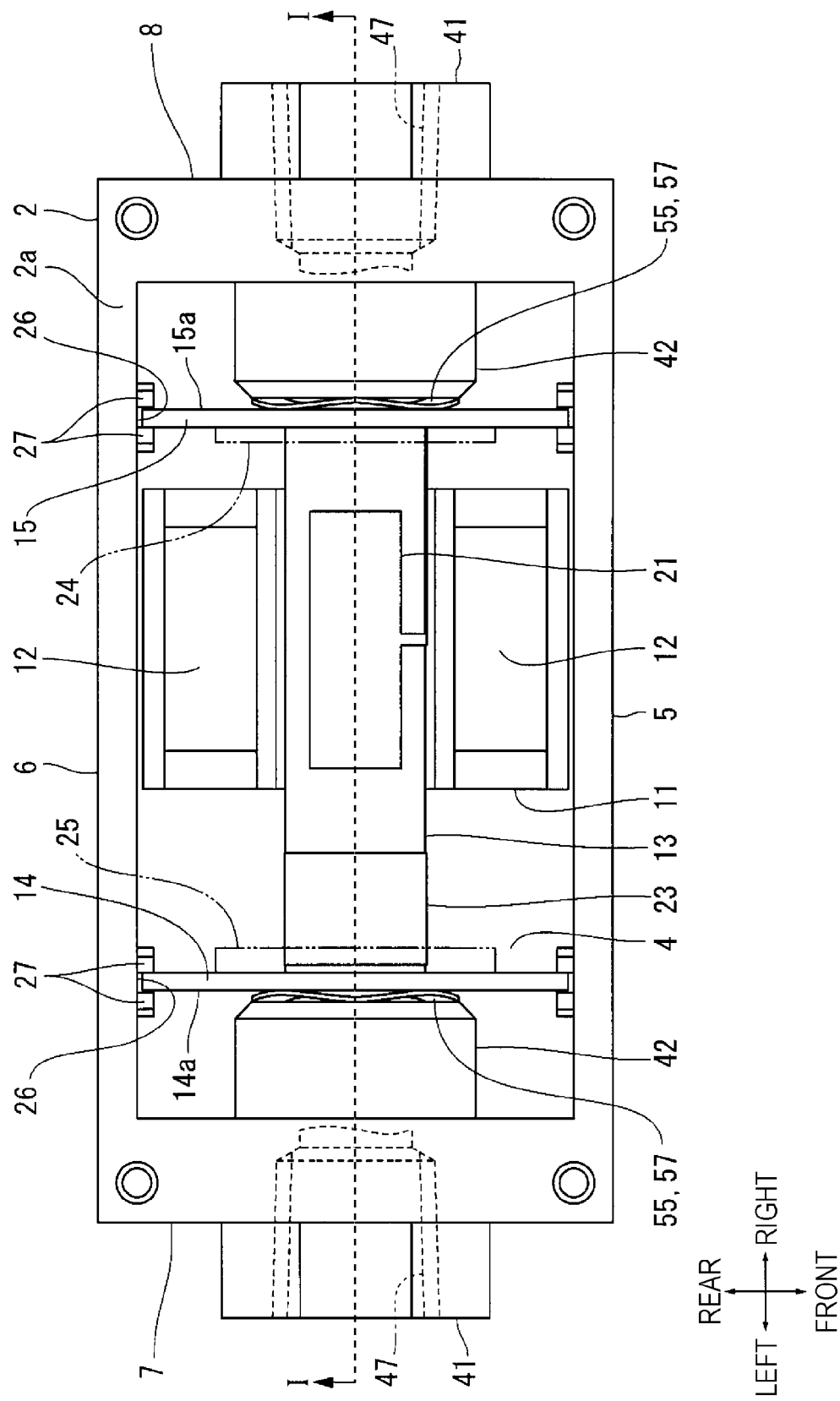
FIG. 2 is a plan view of the housing portion.
Figure 3:
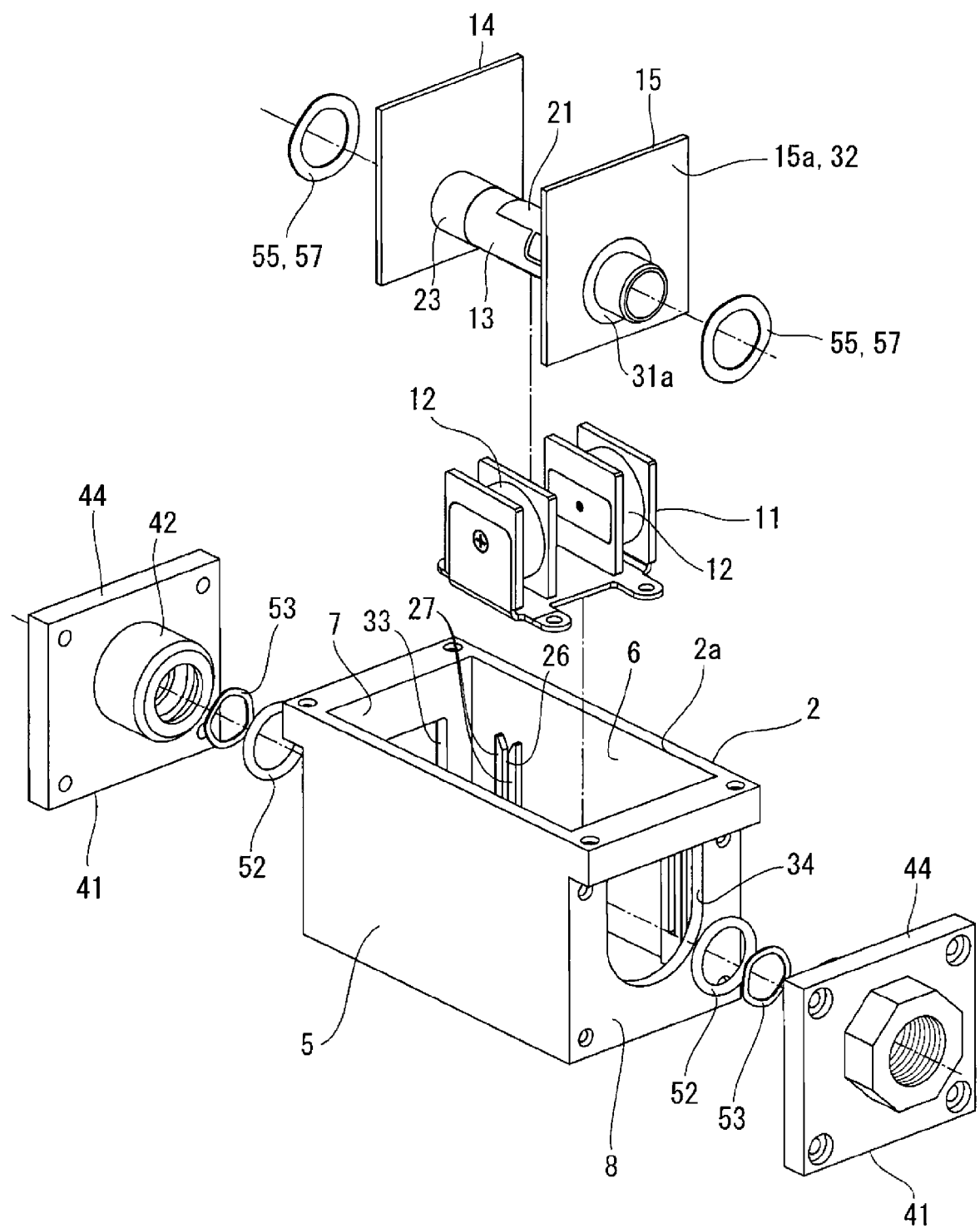
FIG. 3 is an exploded perspective view of a housing of the electromagnetic flowmeter.

As shown in FIG. 2 and FIG. 3, the housing 2 is formed in a rectangular shape when viewed from the opening side (upper side in FIG. 3). The housing 2 has a rectangular bottom wall 4, first and second side walls 5, 6, and third and fourth side walls 7, 8. The first and second side walls 5, 6 extend in a long-side direction of the bottom wall 4. The third and fourth side walls 7, 8 extend in a short-side direction of the bottom wall 4. The first side wall 5 and the second side wall 6 are parallel to each other. The third side wall 7 and the fourth side wall 8 are parallel to each other. The housing 2 of the embodiment is molded into a predetermined shape by using a plastic as a material. The plastic is an electrically insulating material. Therefore, the bottom wall 4, the first and second side walls 5, 6, and the third and fourth side walls 7, 8 are integrally formed by integral molding.

In the following description, for the sake of convenience, a direction in which the bottom wall 4 and the opening 2a line up is defined as upper and lower direction, the long-side direction of the bottom wall 4 is defined as right and left direction, and the short-side direction of the bottom wall 4 is defined as front and rear direction. As shown in FIG. 1, the third side wall 7 is located at the left of the housing 2, and the fourth side wall 8 is located at the right of the housing 2. As shown in FIG. 2, the first side wall 5 is located at the front of the housing 2, and the second side wall 6 is located at the rear of the housing 2. Furthermore, the bottom wall 4 is located at the bottom of the housing 2, and the opening 2a is located at the top of the housing 2.

The lid 3 contains a main processing unit 9 that finds a flow rate through computation. The configuration of the main processing unit 9 will be described later.

A yoke 11 is mounted on the bottom wall 4 of the housing 2. An exciting coil 12 is provided at each of the front end and rear end of the yoke 11. As the exciting coils 12 are excited, a magnetic field is generated between the front end and rear end of the yoke 11. As shown in FIG. 1, the yoke 11 is positioned closer to the opening 2a by a predetermined height than the bottom wall 4 such that the exciting coils 12 are at the same level as a measuring tube 13 (described later). Therefore, a magnetic field generated from the exciting coils 12 crosses the measuring tube 13 in the front and rear direction.

A first printed circuit board 14 and a second printed circuit board 15 each are mounted on the first and second side walls 5, 6 of the housing 2. The first printed circuit board 14 is located near the third side wall 7 so as to extend in the front and rear direction and in the upper and lower direction. The second printed circuit board 15 is located near the fourth side wall 8 so as to extend in the front and rear direction and in the upper and lower direction.

Each of these first and second printed circuit boards 14, 15 has a rectangular plate shape. A circular through-hole 16 is perforated at the center portion of each of these first and second printed circuit boards 14, 15. The measuring tube 13 is passed through these through-holes 16.

The measuring tube 13 is a tube through which a fluid to be measured (not shown) flows. The measuring tube 13 is formed in a cylindrical shape and made of ceramics. The measuring tube 13 is press-fitted into the through-holes 16 of the first and second printed circuit boards 14, 15. The fluid to be measured flows from left to right in FIG. 1. The material of the measuring tube 13 may be changed as needed as long as the material is an electrically insulating material, and may be, for example, a plastic. The first and second printed circuit boards 14, 15 are respectively provided at both ends of the measuring tube 13. Although not shown in the drawing, a shield case that covers the measuring tube 13 may be provided between the first printed circuit board 14 and the second printed circuit board 15.

First and second electrodes 21, 22 for measuring a flow rate are provided on the measuring tube 13. A third electrode 23 for measuring an electric conductivity is provided on the measuring tube 13. The first and second electrodes 21, 22 are disposed at locations at which the first and second electrodes 21, 22 sandwich the measuring tube 13 in the upper and lower direction. The first and second electrodes 21, 22 are connected to a flow rate measuring circuit 24 for measuring a flow rate. The second printed circuit board 15 has the flow rate measuring circuit 24. The flow rate measuring circuit 24 will be described later.

Each of the first to third electrodes 21 to 23 is made from a thin-film metal material (for example, copper foil), and is bonded to the measuring tube 13 by adhesive agent.

The first electrode 21 and the second electrode 22 are disposed so as to face each other in a direction perpendicular to a magnetic field that is generated from the exciting coils 12.

The third electrode 23 is formed in a shape that the third electrode 23 covers all around a part of the left-side portion of the measuring tube 13. The third electrode 23 is connected to an electric conductivity measuring circuit 25 for measuring an electric conductivity. The first printed circuit board 14 has the electric conductivity measuring circuit 25. The electric conductivity measuring circuit 25 will be described later. The flow rate measuring circuit 24 and the electric conductivity measuring circuit 25 are connected to the main processing unit 9 (described later) via lead wires (not shown). In this embodiment, these flow rate measuring circuit 24 and electric conductivity measuring circuit 25 may be regarded as the measuring circuit in the aspect of the present disclosure.

The first and second printed circuit boards 14, 15 each are mounted such that both ends in the front and rear direction are respectively mounted on the first and second side walls 5, 6 of the housing 2 in a state where the first and second printed circuit boards 14, 15 are respectively fixed to both ends of the measuring tube 13. When the first and second printed circuit boards 14, 15 are mounted in the housing 2 in this way, the first and second printed circuit boards 14, 15 and the measuring tube 13 are accommodated in the housing 2.

A mounting structure for mounting the first and second printed circuit boards 14, 15 in the housing 2 is a structure for inserting both ends of each of the first and second printed circuit boards 14, 15 in the front and rear direction to guide grooves 26. The first and second side walls 5, 6 of the housing 2 have the guide grooves 26. Each of the guide grooves 26 is formed between a pair of elongated projections 27 extending in the upper and lower direction. This mounting structure is configured such that the first and second printed circuit boards 14, 15 are movable in the front and rear direction, in the right and left direction, and in the upper and lower direction against frictional resistance with respect to the housing 2.

Figure 4:
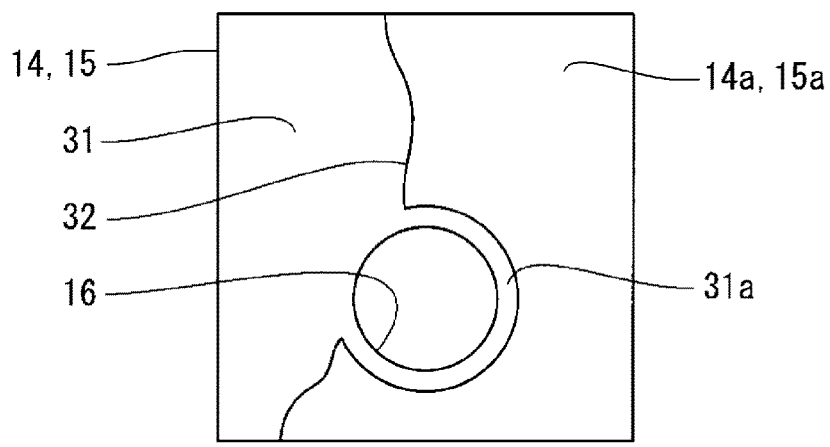
FIG. 4 is a front view showing one of principal surfaces of each of first and second printed circuit boards.

As shown in FIG. 4, a shield pattern 31 is provided on one of principal surfaces 14a (see FIG. 2) of the first printed circuit board 14 on the side away from the second printed circuit board 15, and a shield pattern 31 is also provided on one of principal surfaces 15a of the second printed circuit board 15 on the side away from the first printed circuit board 14. Each of the shield patterns 31 is a film made of a conductor, and covers all over a corresponding one of the principal surfaces 14a, 15a. Each shield pattern 31 of the embodiment is covered with a resist 32 such that an annular exposed portion 31a is formed around the through-hole 16. FIG. 4 shows a state where part of the resist 32 is omitted.

In this embodiment, the shield patterns 31 may be regarded as the electrically conductive portion in the aspect of the present disclosure. The shield pattern 31 of the first printed circuit board 14 is electrically connected to the electric conductivity measuring circuit 25 of the first printed circuit board 14 via a wiring pattern (not shown) in the circuit board. The shield pattern 31 of the second printed circuit board 15 is electrically connected to the flow rate measuring circuit 24 of the second printed circuit board 15 via a wiring pattern (not shown) in the circuit board.

As shown in FIG. 1, the third side wall 7 of the housing 2 has a connecting port 33 at a location that faces one end of the measuring tube 13, and the fourth side wall 8 of the housing 2 has a connecting port 34 at a location that faces the other end of the measuring tube 13. The connecting port 33 is formed so as to extend through the third side wall 7 in the right and left direction. The connecting port 34 is formed so as to extend through the fourth side wall 8 in the right and left direction. A cylindrical portion 42 of a joint 41 (described later) is inserted in each of these connecting ports 33, 34.

Each of the joints 41 is used to connect a tube (not shown), and is fixed to a corresponding one of both ends of the housing 2 in the right and left direction.

The joint 41 located at the left-side end of the housing 2 and the joint 41 located at the right-side end of the housing 2 have the same structure. Each joint 41 of the embodiment has the cylindrical portion 42 and a flange portion 44. The cylindrical portion 42 forms a fluid passage 43 in cooperation with the measuring tube 13. The flange portion 44 projects from the cylindrical portion 42 in the upper and lower direction and in the front and rear direction. Each joint 41 is made of an electrically conductive material.

Figure 5:
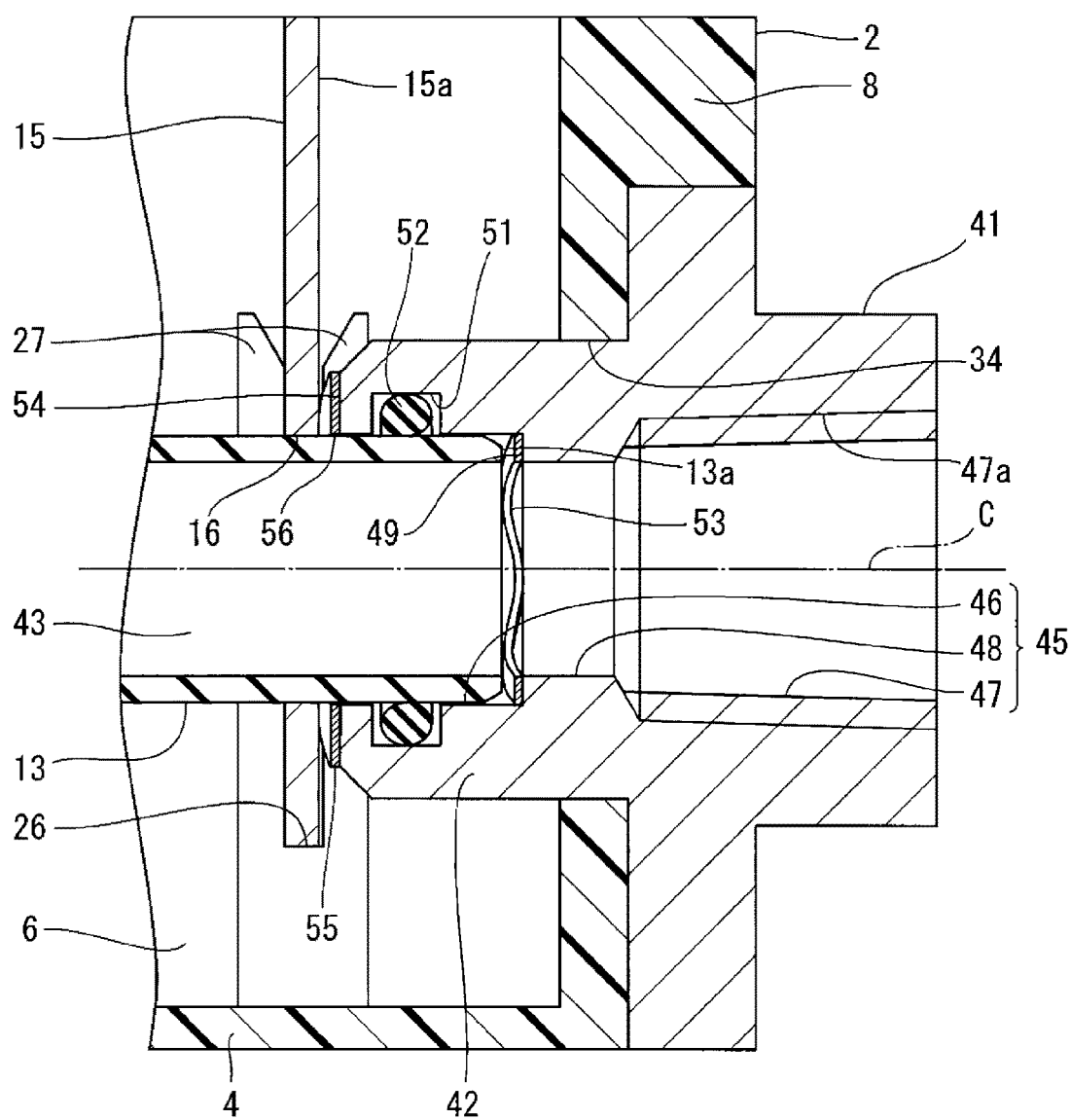
FIG. 5 is an enlarged cross-sectional view showing a relevant portion.

As shown in FIG. 5, the hollow of the cylindrical portion 42 is a communication hole 45. Each communication hole 45 of the embodiment is made up of a first hole 46, a threaded hole 47, and a second hole 48. The first hole 46 is open to the inside of the housing 2. The measuring tube 13 is inserted in the first hole 46. The threaded hole 47 is open to the outside of the housing 2. These first hole 46 and threaded hole 47 communicate with each other via the second hole 48. The shape of the opening of each of the first hole 46 and the second hole 48 is circular. An internal thread 47a for connecting a tube is formed in the threaded hole 47.

The diameter of the second hole 48 is smaller than the diameter of the first hole 46 or the diameter of the threaded hole 47. A first flat surface 49 is formed at the boundary portion between the first hole 46 and the second hole 48. The first flat surface 49 is perpendicular to the axis C of the cylindrical portion 42. The first flat surface 49 is formed in an annular shape when viewed in the axial direction of the cylindrical portion 42.

The diameter of the first hole 46 is slightly larger than the outside diameter of each of both ends of the measuring tube 13. Therefore, the measuring tube 13 is loosely fitted to the first hole 46.

An annular groove 51 is formed on the wall surface of the first hole 46. An O-ring 52 is fitted to the annular groove 51. The O-ring 52 seals any gap between the outer periphery of the measuring tube 13 and the first hole 46 in a liquid-tight manner.

When the measuring tube 13 is inserted in the first hole 46, the above-described annular first flat surface 49 faces a distal end surface 13a of the measuring tube 13. An annular elastic component 53 is provided between the first flat surface 49 and the distal end surface 13a of the measuring tube 13. The elastic component 53 of the embodiment is a waved washer.

As shown in FIG. 3, the flange portion 44 of each joint 41 has a rectangular plate shape, and fixed to a corresponding one of the third and fourth side walls 7, 8 of the housing 2 by fixing bolts (not shown).

A second flat surface 54 is formed at the distal end of each cylindrical portion 42, located in the housing 2. The second flat surface 54 is perpendicular to the axis C of the cylindrical portion 42. The second flat surface 54 is formed in an annular shape when viewed in the axial direction of the cylindrical portion 42. One of the second flat surfaces 54 faces the principal surface 14a of the first printed circuit board 14 in a state where the joint 41 is attached to the housing 2. The other one of the second flat surfaces 54 faces the principal surface 15a of the second printed circuit board 15 in a state where the joint 41 is attached to the housing 2.

A connecting component 55 is provided between the second flat surface 54 and the first printed circuit board 14. A connecting component 55 is also provided between the second flat surface 54 and the second printed circuit board 15. Each connecting component 55 is formed in a ring shape with a hollow 56 that allows insertion of the measuring tube 13.

Each connecting component 55 has one end 55a and the other end 55b. The one end 55a contacts with the exposed portion 31a of the shield pattern 31 in the right and left direction of the housing 2. The other end 55b contacts with the second flat surface 54 in the right and left direction. Each connecting component 55 electrically connects the shield pattern 31 to the cylindrical portion 42.

Furthermore, each connecting component 55 is configured to elastically deform to reduce the distance between the one end 55a and the other end 55b by a predetermined amount. More specifically, each connecting component 55 is sandwiched by a corresponding one of the cylindrical portions 42 and a corresponding one of the first and second printed circuit boards 14, 15, and is compressed as a result of elastic deformation in a direction in which the distance between the one end 55a and the other end 55b reduces (in the right and left direction of the housing 2).

Figure 6:
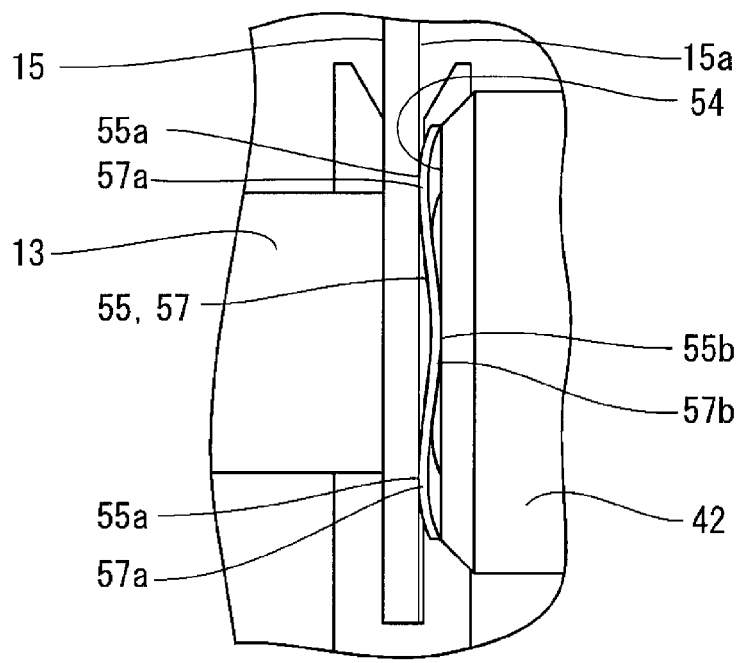
FIG. 6 is a side view of a connecting component.
Figure 7:
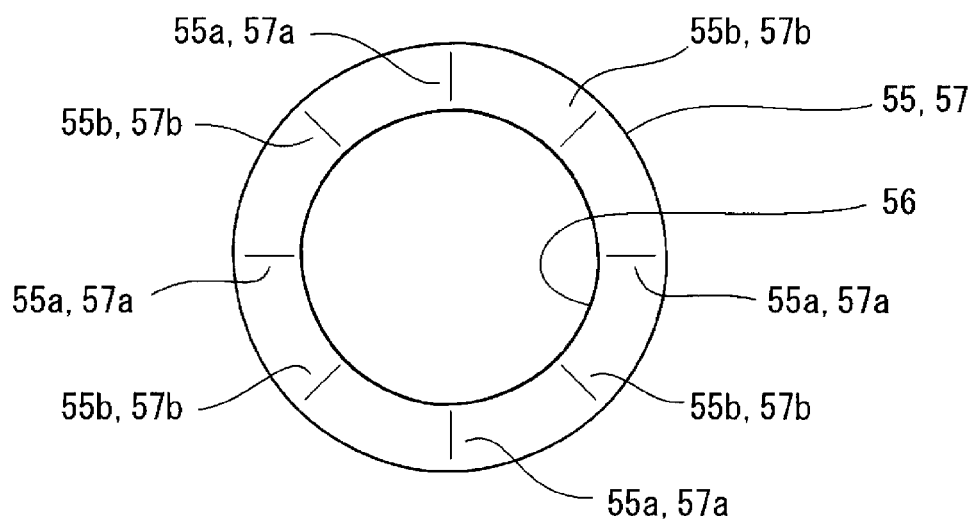
FIG. 7 is a front view of the connecting component.
Figure 8:
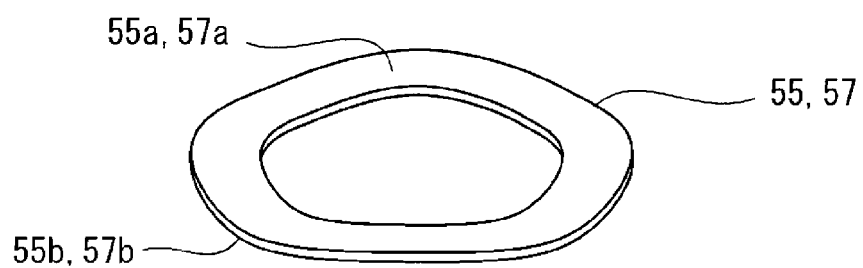
FIG. 8 is a perspective view of the connecting component.

As shown in FIG. 6 to FIG. 8, each connecting component 55 of the embodiment is a waved washer 57. The material of the waved washer 57 is a metal. That is, each connecting component 55 is the waved washer 57 having elasticity and electrical conductivity.

In each connecting component 55 that is the waved washers 57, a first contact portion 57a and a second contact portion 57b are provided alternately in the circumferential direction of the connecting component 55. The first contact portion 57a contacts with the exposed portion 31a of the shield pattern 31. The second contact portion 57b contacts with the second flat surface 54 of the cylindrical portion 42.

Each joint 41 is connected to the shield pattern 31 of a corresponding one of the first and second printed circuit boards 14, 15 via a corresponding one of the connecting component 55. Therefore, electrical continuity between each joint 41 and the corresponding shield pattern 31 is achieved, with the result that each joint 41 substantially functions as a common electrode.

Figure 9:
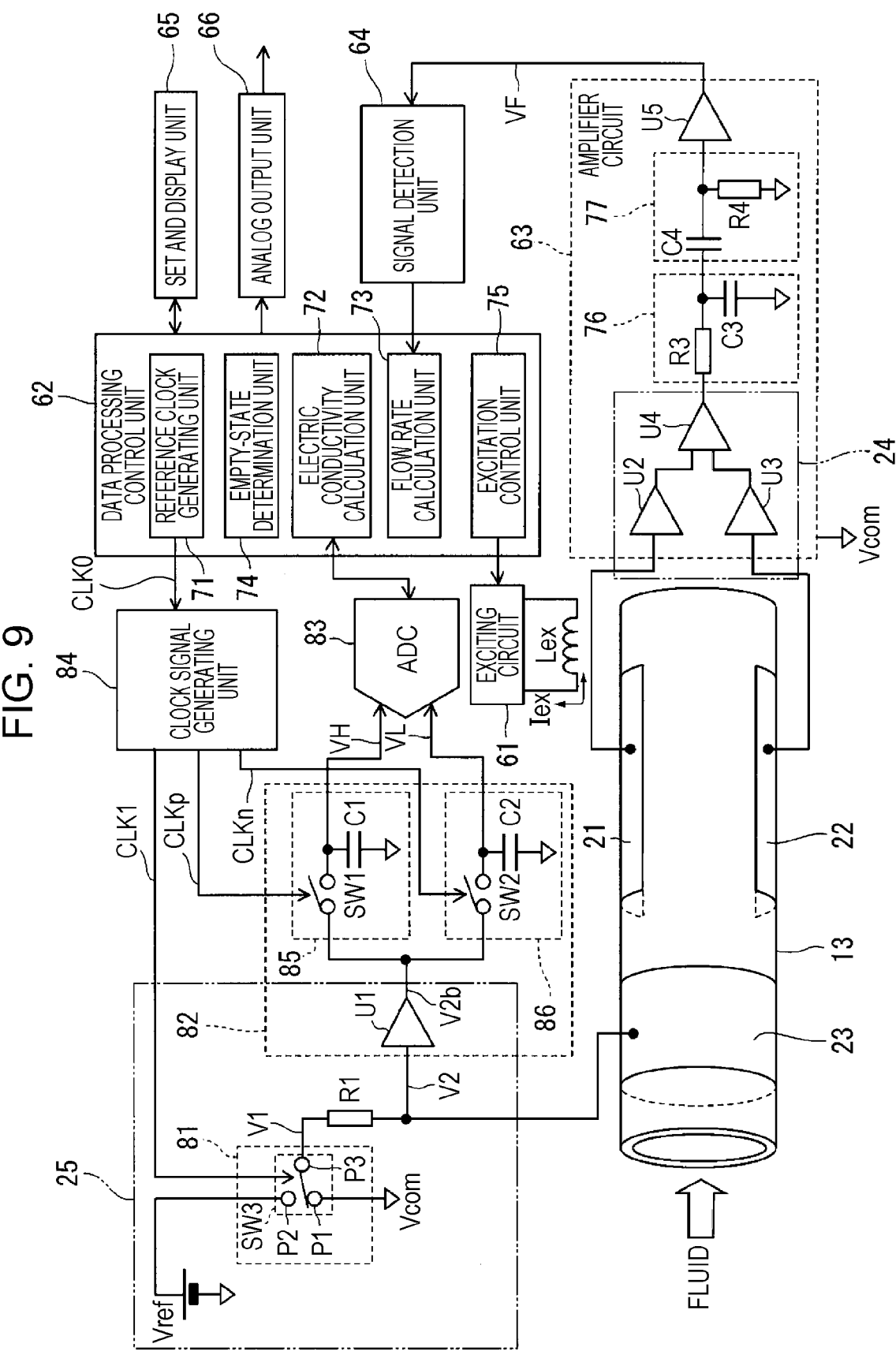
FIG. 9 is a circuit diagram of the electromagnetic flowmeter.

The configuration of the circuit of the main processing unit 9, the configuration of the electric conductivity measuring circuit 25 of the first printed circuit board 14, and the configuration of the flow rate measuring circuit 24 of the second printed circuit board 15 will be described with reference to FIG. 9.

The electromagnetic flowmeter 1 of the embodiment measures the flow rate of a fluid flowing through the measuring tube 13 and also measures the electric conductivity of the fluid flowing through the measuring tube 13. Hereinafter, a flow rate measuring function for measuring a flow rate and an electric conductivity measuring function for measuring an electric conductivity will be separately described in detail.

(1) Flow Rate Measuring Function

The electromagnetic flowmeter 1 supplies an alternating current (hereinafter, referred to as exciting current Iex), of which the polarity alternately changes, to the exciting coils 12 disposed such that a magnetic field generation direction is perpendicular to the flow direction of a fluid flowing through the measuring tube 13. The electromagnetic flowmeter 1 detects an electromotive force that is generated between the pair of first electrode 21 and second electrode 22 disposed on the measuring tube 13 perpendicularly to the magnetic field generated from the exciting coils 12. Thus, the electromagnetic flowmeter 1 measures the flow rate of a fluid flowing through the measuring tube 13.

The flow rate measuring function is implemented by the exciting coils 12, the measuring tube 13, an exciting circuit 61 (see FIG. 9), the first electrode 21, the second electrode 22, a data processing control unit 62, an amplifier circuit 63, a signal detection unit 64, a set and display unit 65, and an analog output unit 66. Of these functional units that implement the flow rate measuring function, part of the amplifier circuit 63 is provided in the second circuit board as the flow rate measuring circuit 24, and the other functional units other than the part of the amplifier circuit 63 are provided in the main processing unit 9.

The exciting circuit 61 is a circuit that applies the exciting current Iex to the exciting coils 12. The output of the exciting current Iex by the exciting circuit 61 is controlled by the data processing control unit 62.

The data processing control unit 62 is a functional unit that generally controls the functional units that are components of the electromagnetic flowmeter 1, and is, for example, a program processing unit, such as a microcontroller and a CPU. Specifically, the data processing control unit 62 includes a reference clock generating unit 71, an electric conductivity calculation unit 72, a flow rate calculation unit 73, an empty-state determination unit 74, and an excitation control unit 75. These functional units that are components of the data processing control unit 62 are implemented by, for example, controlling hardware resources that are components of the program processing unit in accordance with programs.

The excitation control unit 75 is a functional unit that causes a magnetic field to be generated in the measuring tube 13 by periodically changing the polarities of the exciting current Iex that is supplied to the exciting coils 12 through control over the exciting circuit 61. Hereinafter, the frequency of the exciting current Iex is also referred to as exciting frequency. The details of the functional units other than the excitation control unit 75 in the data processing control unit 62 will be described later.

The amplifier circuit 63 operates at the potential of the common electrode that is the joint 41, that is, a common potential Vcom as a reference. The amplifier circuit 63 amplifies an electromotive force generated between the first and second electrodes 21, 22 and outputs the amplified electromotive force as a flow rate signal VF.

In the present embodiment, description will be made on the assumption that the common potential Vcom is 0 V (ground potential).

Specifically, the amplifier circuit 63 includes preamplifiers U2, U3, a differential amplifier circuit U4, a low pass filter circuit 76, a high pass filter circuit 77, and a buffer amplifier U5.

The preamplifier U2 is, for example, an operational amplifier, or the like. The preamplifier U2 is a circuit that amplifies the voltage of the first electrode 21. The preamplifier U3 is, for example, an operational amplifier, or the like. The preamplifier U3 is a circuit that amplifies the voltage of the second electrode 22. The differential amplifier circuit U4 is, for example, an operational amplifier. The differential amplifier circuit U4 is a circuit that generates a differential signal commensurate with the difference between the voltage amplified by the preamplifier U2 and the voltage amplified by the preamplifier U3.

Each of the low pass filter circuit 76 and the high pass filter circuit 77 is a circuit that attenuates a predetermined frequency component contained in a signal obtained by amplifying an electromotive force generated between the first electrode 21 and the second electrode 22. The predetermined frequency component is a frequency component corresponding to an alternating-current signal V1 that is used to measure an electric conductivity (described later).

The low pass filter circuit 76 includes, for example, a resistor R3 and a capacitor C3. The high pass filter circuit 77 includes, for example, a capacitor C4 and a resistor R4. The constants of the resistors R3, R4 and capacitors C3, C4 that are components of the low pass filter circuit 76 and high pass filter circuit 77 are set to appropriate values to attenuate the above-described predetermined frequency components.

The buffer amplifier U5 is, for example, an operational amplifier, or the like. The buffer amplifier U5 is a circuit that buffers the differential signal output via the low pass filter circuit 76 and the high pass filter circuit 77 and outputs the differential signal as the flow rate signal VF.

The signal detection unit 64 is a functional unit that detects the voltage of the flow rate signal VF output from the buffer amplifier U5 and supplies the detected voltage to the flow rate calculation unit 73 in the data processing control unit 62.

The flow rate calculation unit 73 calculates the flow rate of a fluid flowing through the measuring tube 13 based on the voltage of the flow rate signal VF, detected by the signal detection unit 64. A flow rate calculation process that is executed by the flow rate calculation unit 73 is implemented by, for example, a known flow rate calculation technique in an existing capacitance-type electromagnetic flowmeter.

The set and display unit 65 has the function of detecting setting operation input made by an operator and outputting the setting operation input to the data processing control unit 62 and the function of showing display output from the data processing control unit 62 with an LED or an LCD.

The analog output unit 66 is a functional unit for outputting results computed by the data processing control unit 62 to an external device.

With the above-described functional units, the flow rate measuring function of the electromagnetic flowmeter 1 is implemented.

(2) Electric Conductivity Measuring Function

The electromagnetic flowmeter 1 applies an alternating-current signal via the resistor R1 to the third electrode 23 provided on the outer periphery of the measuring tube 13 in a state where the joint 41 that is exposed to a fluid flowing through the measuring tube 13 is connected to the common potential Vcom, and detects the amplitude of the signal V2 that is generated in the third electrode 23 at that time. Thus, the electromagnetic flowmeter 1 measures the electric conductivity of the fluid flowing through the measuring tube 13.

The electric conductivity measuring function is implemented by the measuring tube 13, the third electrode 23, the joint 41, an alternating-current signal generating unit 81, a voltage detection unit 82, the data processing control unit 62, an analog-digital conversion unit (ADC) 83, a clock signal generating unit 84, the set and display unit 65, and the analog output unit 66.

Of these functional units that implement the electric conductivity measuring function, the alternating-current signal generating unit 81 and part of the voltage detection unit 82 are provided in the first printed circuit board 14 as the electric conductivity measuring circuit 25, and the other functional units other than these functional units are provided in the main processing unit 9.

The clock signal generating unit 84 is a circuit that generates a clock signal for controlling the operation timing of each functional unit. Specifically, the clock signal generating unit 84 generates various clock signals CLK1, CLKp, CLKn by demultiplexing a reference clock signal CLK0 output from the reference clock generating unit 71 of the data processing control unit 62 (described later).

The alternating-current signal generating unit 81 is a circuit that generates an alternating-current signal that is applied to the third electrode 23. The alternating-current signal generating unit 81 generates, for example, a pulse V1 as the alternating-current signal. The alternating-current signal generating unit 81 is, for example, implemented by a switch SW3 including a first terminal P1, a second terminal P2, and a third terminal P3. The first terminal P1 is connected to the common potential Vcom. The second terminal P2 is connected to a reference potential Vref (>Vcom). The third terminal P3 is connected to the resistor R1.

The switch SW3 switches a connection destination of the third terminal P3 between the first terminal P1 and the second terminal P2 in response to the constant-period clock signal CLK1 output from the clock signal generating unit 84. Thus, the pulse V1 of which the low-level voltage is the common potential Vcom, the high-level voltage is the reference potential Vref and the frequency f1 is the same as that of the clock signal CLK1 is output from the third terminal P3.

One end of the resistor R1 is connected to the output terminal of the alternating-current signal generating unit 81 (the third terminal of the switch SW3), and the other end of the resistor R1 is connected to the third electrode 23. Thus, the pulse V1 output from the alternating-current signal generating unit 81 is input to the third electrode 23 via the resistor R1.

The voltage detection unit 82 is a circuit that detects the voltage of the signal V2 generated at the third electrode 23. The voltage detection unit 82 includes, for example, a buffer amplifier U1 and sample hold circuits 85, 86. The buffer amplifier U1 is, for example, an operational amplifier. The buffer amplifier U1 buffers the signal V2 generated at the third electrode 23 and outputs a signal. The voltage of a signal V2b that is output from the buffer amplifier U1 is substantially equal to the voltage of the signal V2 (V2b≈V2).

Each of the sample hold circuits 85, 86 is a circuit that samples the voltage of the signal V2b output from the buffer amplifier U1 at predetermined timing and holds the voltage of the signal V2b.

The sample hold circuit 85 includes, for example, a switch SW1 and a capacitor C1. One end of the switch SW1 is connected to the output terminal of the buffer amplifier U1. The capacitor C1 is connected between the other end of the switch SW1 and the common potential Vcom. The switch SW1 is, for example, switched between an on state and an off state in response to the clock signal CLKp. Thus, the sample hold circuit 85 is able to sample the voltage of the signal V2b in response to the clock signal CLKp.

The sample hold circuit 86 includes, for example, a switch SW2 and a capacitor C2. One end of the switch SW2 is connected to the output terminal of the buffer amplifier U1. The capacitor C2 is connected between the other end of the switch SW2 and the common potential Vcom. The switch SW2 is, for example, switched between an on state and an off state in response to the clock signal CLKn. Thus, the sample hold circuit 86 is able to sample the voltage of the signal V2b in response to the clock signal CLKn.

The analog-digital conversion unit 83 is a circuit that converts the potential difference between a voltage VH taken in by the sample hold circuit 85 and a voltage VL sampled and held by the sample hold circuit 86 to a digital signal.

The reference clock generating unit 71 in the data processing control unit 62 is a functional unit that generates the reference clock signal CLK0 that is supplied to the clock signal generating unit 84. The reference clock generating unit 71 may be implemented by, for example, an oscillator circuit, or the like, that generates a signal with the use of an outboard quartz or ceramic oscillator.

The electric conductivity calculation unit 72 in the data processing control unit 62 is a functional unit that calculates the electric conductivity of a fluid to be measured, based on the amplitude of the voltage detected by the voltage detection unit 82.

Furthermore, the data processing control unit 62 includes the empty-state determination unit 74 that determines whether there is a fluid in the measuring tube 13. The empty-state determination unit 74 determines whether there is a fluid in the measuring tube 13 based on the electric conductivity calculated by the electric conductivity calculation unit 72. For example, the empty-state determination unit 74 determines that there is no fluid in the measuring tube 13 when the electric conductivity calculated by the electric conductivity calculation unit 72 is smaller than a predetermined threshold.

The set and display unit 65, for example, detects operation input made by an operator, instructs the data processing control unit 62 to measure an electric conductivity or to execute an empty-state determination process, and shows information about the electric conductivity measured by the data processing control unit 62 with the use of an LED, an LCD, or the like. The analog output unit 66, for example, outputs the measured electric conductivity result calculated by the electric conductivity calculation unit 72 or information about the result determined by the empty-state determination unit 74 over a 4 to 20 mA analog signal.

To assemble the thus configured electromagnetic flowmeter 1, first, an assembly made up of the yoke 11 and the exciting coils 12 is mounted in the housing 2, and, subsequently, an assembly made up of the measuring tube 13 and the first and second printed circuit boards 14, 15 is mounted. Then, each end of the measuring tube 13 is passed through the hollow 56 of a corresponding one of the connecting components 55, and the connecting components 55 are respectively held on both ends of the measuring tube 13. After that, the cylindrical portion 42 of each joint 41 is inserted in a corresponding one of the connecting ports 33, 34 of the housing 2, and the pair of joints 41 is attached to both ends of the housing 2 in the right and left direction. The O-ring 52 and the elastic component 53 are fitted into a corresponding one of the cylindrical portions 42 in advance before the joint 41 is connected to the housing 2.

Each joint 41 is fixed to the housing 2 when the flange portion 44 is fastened to a corresponding one of the third and fourth side walls 7, 8 of the housing 2 by fixing bolts (not shown). Since each joint 41 is fixed to the housing 2 in this way, the elastic component 53 in the cylindrical portion 42 is sandwiched by the first flat surface 49 in the cylindrical portion 42 and the distal end surface 13a of the measuring tube 13, and the connecting component 55 is held between the second flat surface 54 located at the distal end of the cylindrical portion 42 and a corresponding one of the first and second printed circuit boards 14, 15.

Each connecting component 55 is compressed in the right and left direction of the housing 2 to elastically deform in a direction in which the distance between the one end 55a and the other end 55b reduces. As a result, the cylindrical portion 42 of each joint 41 and the shield pattern 31 of a corresponding one of the first and second printed circuit boards 14, 15 are electrically connected to each other via the connecting component 55, and each joint 41 functions as the common electrode.

Therefore, in the electromagnetic flowmeter 1 according to the embodiment, a component required to electrically connect each joint 41 to the shield pattern 31 of a corresponding one of the printed circuit boards is only the connecting component 55. That is, no component for electrical connection, such as the lead wire, the connector, and the terminal, described in Japanese Unexamined Patent Application Publication No. 8-021757 or Japanese Patent No. 5887683 is required.

In addition, connection of each joint 41 to the shield pattern 31 by the connecting component 55 of the embodiment is achieved in process of attaching the joint 41 to the housing 2, so no exclusive work for electrical connection is required.

Therefore, since each joint 41 is simply electrically connected to the shield pattern 31 of a corresponding one of the first and second printed circuit boards 14, 15 by the only one connecting component 55, a structure for electrical continuity with each joint 41 is simplified, and work for electrical continuity with each joint 41 is simple, with the result that a manufacturing cost for the electromagnetic flowmeter 1 is held down.

Each connecting component 55 of the embodiment is held in an elastically deformed state between a corresponding one of the joints 41 and a corresponding one of the first and second printed circuit boards 14, 15. Therefore, although a structure for electrical continuity is implemented by the contact between metals, electrical connection is reliably performed, and the reliability of electrical continuity increases.

In addition, since each of the first and second printed circuit boards 14, 15 is pushed toward the inside of the housing 2 by the spring force of a corresponding one of the connecting components 55, even when each of the first and second printed circuit boards 14, 15 is loosely fitted to the guide groove 26 of the housing 2, these first and second printed circuit boards 14, 15 are reliably fixed to the housing 2.

Each connecting component 55 of the embodiment is formed in a ring shape with the hollow 56 that allows insertion of the measuring tube 13.

Therefore, all the area of the second flat surface 54 of each cylindrical portion 42 is an object that provides electrical continuity, so electrical connection of each joint 41 to the shield pattern 31 of a corresponding one of the printed circuit boards is further reliable.

The measuring tube 13 of the embodiment is provided with the first to third electrodes 21 to 23 on its outer periphery. The first printed circuit board 14 has the electric conductivity measuring circuit 25 connected to the third electrode 23 and a corresponding one of the shield patterns 31. The second printed circuit board 15 has the flow rate measuring circuit 24 connected to the first and second electrodes 21, 22 and the other shield pattern 31.

Therefore, since the flow rate measuring circuit 24 and the electric conductivity measuring circuit 25 are provided near the first to third electrodes 21 to 23 and the joints 41, an electromagnetic flowmeter that is hard to be affected by noise is provided.

The first and second printed circuit boards 14, 15 of the embodiment are respectively provided at both ends of the measuring tube 13.

Therefore, the connecting component 55 is allowed to be provided for each of the first and second printed circuit boards 14, 15, and an assembly made up of the measuring tube 13 and the first and second printed circuit boards 14, 15 can be elastically supported by the spring force of each connecting component 55 from both ends of the measuring tube 13. As a result, the measuring tube 13 and the first and second printed circuit boards 14, 15 are reliably fixed.

In addition, since each of the first and second printed circuit boards 14, 15 is electrically connected to a corresponding one of the joints 41 by the connecting component 55, the potential of a fluid to be measured is uniform in the measuring tube 13 when electrical continuity between the first printed circuit board 14 and the second printed circuit board 15 is achieved. As a result, a stable flow rate signal is obtained.

In the embodiment, the electrically conductive portion of the aspect of the disclosure is each shield pattern 31 provided all over a corresponding one of the principal surfaces 14a, 15a of the first and second printed circuit boards 14, 15, facing the cylindrical portion 42. Therefore, since a shield structure that covers the measuring tube 13 is formed by using the first and second printed circuit boards 14, 15 as part of a structure, an electromagnetic flowmeter that is hard to be affected by noise is provided.

Each connecting component 55 of the embodiment is the metal waved washer 57 in which the first contact portion 57a that contacts with the shield pattern 31 and the second contact portion 57b that contacts with the cylindrical portion 42 are provided alternately in the circumferential direction. Therefore, since a ready-made waved washer is allowed to be used as each connecting component 55, a manufacturing cost further decreases, and a further low-cost electromagnetic flowmeter is provided.

Alternative Embodiment of Connecting Component

Each connecting component 55 is not limited to the above-described waved washer 57, and may be changed as required.

Figure 10:
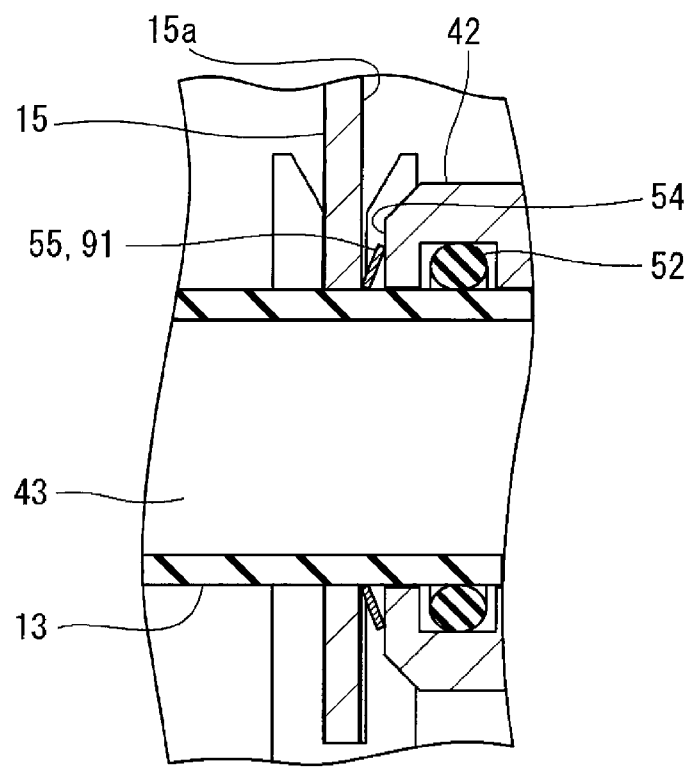
FIG. 10 is a cross-sectional view showing an alternative embodiment of the connecting component.
Figure 11:
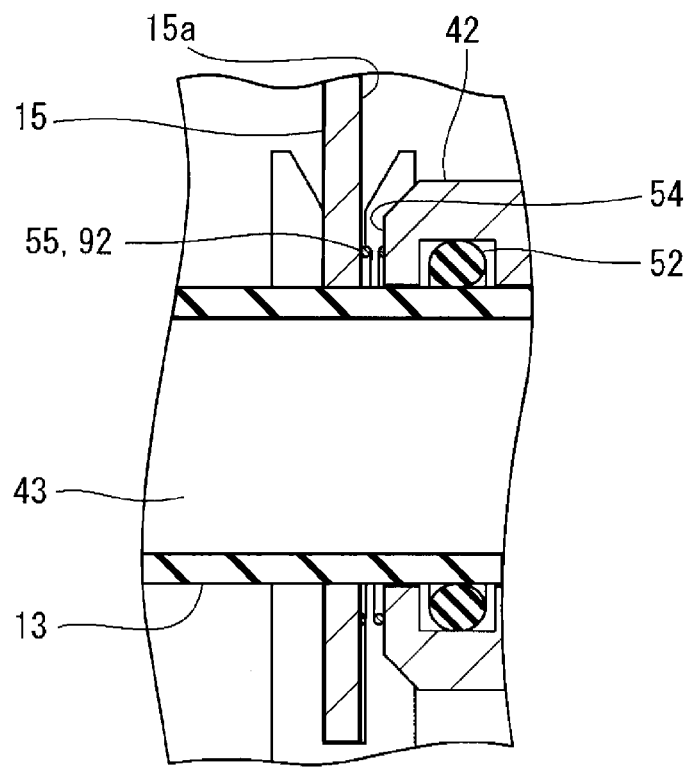
FIG. 11 is a cross-sectional view showing another alternative embodiment of the connecting component.

Each connecting component 55 may be a washer having another shape different from that of the waved washer 57, or may be an annular electrically conductive rubber, a spring connector, an annular spring component shown in FIG. 10, or an annular spring component shown in FIG. 11. Although not shown in the drawing, the spring connector may be made up of, for example, a helical compression spring and a pin. The helical compression spring extends in the right and left direction of the housing 2. The pin is upright at the distal end of the helical compression spring so as to be located along the same axis. In FIG. 10 and FIG. 11, like reference numerals denote the same or equivalent components to those described with reference to FIG. 1 to FIG. 9, and the detailed description is omitted where appropriate.

The connecting component 55 shown in FIG. 10 is a metal belleville spring 91. With this configuration, the ready-made belleville spring 91 is allowed to be used as the connecting component 55, so a manufacturing cost further decreases, and a further low-cost electromagnetic flowmeter is provided.

The connecting component 55 shown in FIG. 11 is a metal helical compression spring 92 having a center portion through which the measuring tube 13 is inserted. According to this embodiment, the ready-made helical compression spring 92 is allowed to be used as the connecting component 55, so a manufacturing cost further decreases, and a further low-cost electromagnetic flowmeter is provided.

In the above-described embodiment, the example in which the aspect of the disclosure is applied to the electromagnetic flowmeter including the first and second printed circuit boards 14, 15 is described. However, the aspect of the disclosure is not limited to this configuration. The aspect of the disclosure is applicable even when a single printed circuit board is provided on a measuring tube. In this case, for example, when the housing 2 is made of an electrically conductive material, electrical continuity between one of the joints and the other one of the joints is achieved.

What is claimed is:

1. An electromagnetic flowmeter comprising:
   a measuring tube through which a fluid to be measured flows;
   a printed circuit board having a through-hole through which the measuring tube extends, the printed circuit board being fixed to the measuring tube in a state where the measuring tube is passed through the through-hole;
   a housing having a connecting port at a location facing an end of the measuring tube, the housing accommodating the measuring tube and the printed circuit board, the housing supporting the printed circuit board;
   a joint made of an electrically conductive material, the joint being fixed to the housing, the joint having a cylindrical portion, the cylindrical portion being inserted in the connecting port of the housing, the cylindrical portion forming a fluid passage in cooperation with the measuring tube; and
   a connecting component sandwiched by the printed circuit board and the cylindrical portion of the joint, wherein
   the printed circuit board has an electrically conductive portion facing the cylindrical portion, and
   the connecting component has one end that contacts with the electrically conductive portion and an other end that contacts with the cylindrical portion, the connecting component is configured to elastically deform to reduce a distance between the one end and the other end by a predetermined amount, and the connecting component electrically connects the cylindrical portion to the electrically conductive portion.

2. The electromagnetic flowmeter according to claim 1, wherein
   the connecting component is formed in a ring shape with a hollow that allows insertion of the measuring tube.

3. The electromagnetic flowmeter according to claim 2, wherein
   the connecting component is a metal washer in which a first contact portion that contacts with the electrically conductive portion and a second contact portion that contacts with the cylindrical portion are provided alternately in a circumferential direction of the washer.

4. The electromagnetic flowmeter according to claim 2, wherein
   the connecting component is a metal belleville spring.

5. The electromagnetic flowmeter according to claim 1, further comprising:
   an electrode provided on an outer surface of the measuring tube, wherein
   the printed circuit board has a measuring circuit connected to the electrode and the electrically conductive portion.

6. The electromagnetic flowmeter according to claim 1, wherein the printed circuit board is provided at one end of the measuring tube; and wherein the electromagnetic flowmeter further includes another printed circuit board provided at another end of the measuring tube.

7. The electromagnetic flowmeter according to claim 1, wherein
the electrically conductive portion is a shield pattern provided all over one of principal surfaces of the printed circuit board, and the one of the principal surfaces faces the cylindrical portion.

8. The electromagnetic flowmeter according to claim 1, wherein
the connecting component is a metal helical compression spring having a center portion through which the measuring tube is inserted.

* * * * *